United States Patent
Konik et al.

(10) Patent No.: US 8,924,373 B2
(45) Date of Patent: Dec. 30, 2014

(54) QUERY PLANS WITH PARAMETER MARKERS IN PLACE OF OBJECT IDENTIFIERS

(75) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/570,523

(22) Filed: Aug. 9, 2012

(65) Prior Publication Data
US 2014/0046928 A1 Feb. 13, 2014

(51) Int. Cl.
*G06F 17/30* (2006.01)

(52) U.S. Cl.
USPC .............................. 707/714; 707/718; 707/720

(58) Field of Classification Search
CPC ...................... G06F 17/30442; G06F 17/30448
USPC ........................................... 707/714, 718, 720
See application file for complete search history.

(56) References Cited

U.S. PATENT DOCUMENTS

| | | | |
|---|---|---|---|
| 5,864,843 A * | 1/1999 | Carino et al. ...................... 1/1 |
| 2007/0250472 A1 * | 10/2007 | Dettinger et al. .................. 707/2 |
| 2010/0198811 A1 * | 8/2010 | Wiener et al. .................. 707/718 |
| 2011/0161310 A1 * | 6/2011 | Tang et al. ..................... 707/714 |
| 2011/0313999 A1 * | 12/2011 | Bruno et al. ................... 707/718 |
| 2012/0072413 A1 * | 3/2012 | Castellanos et al. ........... 707/718 |
| 2012/0084315 A1 * | 4/2012 | Schneider et al. ............. 707/769 |
| 2012/0130986 A1 * | 5/2012 | Abdellatif et al. ............. 707/718 |
| 2013/0018869 A1 * | 1/2013 | Hanson et al. ................. 707/722 |
| 2013/0097114 A1 * | 4/2013 | Burke et al. ................... 707/602 |
| 2013/0166536 A1 * | 6/2013 | Denton et al. ................. 707/720 |
| 2014/0032593 A1 * | 1/2014 | Libenzi et al. ................. 707/769 |

OTHER PUBLICATIONS

Scott L. Forstie, "Simplify DB2 for i5/OS index advice," http://www.ibm.com/developerworks/data/library/techarticle/dm-0701/forstie, Jan. 25, 2007, pp. 1-7.
"IBM Informix Dynamic Server Performance Guide," http://publib.boulder.ibm.com/infocenter/ids9help/index.jsp?topic=/com.ibm.perf.doc/perf281.htm, Nov. 2, 2005, pp. 1-2.
"Providing Variable Input to Dynamic SQL Using Parameter Markers," Application Development Guide: Programming Client Applications, http://publib.boulder.ibm.com/infocenter/db2luw/v8/topic/com.ibm.db2.udb.doc/ad/t000586 . . . , printed on May 6, 2012, p. 1.

* cited by examiner

*Primary Examiner* — Noosha Arjomandi
(74) *Attorney, Agent, or Firm* — Owen J. Gamon; Roy W. Truelson (57) ABSTRACT

In an embodiment, a first query is received that specifies a first object identifier. If a first query plan exists that implements the first query, except that the first query plan does not comprise the first object identifier and instead comprises a parameter marker in place of the first object identifier, a first query execution plan is created from the first query plan, substituting the first object identifier in the first query execution plan for the parameter marker, and the first query execution plan is executed to read a first object identified by the first object identifier.

16 Claims, 8 Drawing Sheets

QUERY PLANS WITH PARAMETER MARKERS IN PLACE OF OBJECT IDENTIFIERS

FIELD

An embodiment of the invention generally relates to database management systems that process queries with query plans and more particularly to query plans with parameter markers for object identifiers.

BACKGROUND

Computer systems typically comprise a combination of computer programs and hardware, such as semiconductors, transistors, chips, circuit boards, storage devices, and processors. The computer programs are stored in the storage devices and are executed by the processors. Fundamentally, computer systems are used for the storage, manipulation, and analysis of data.

One mechanism for managing data is called a database management system (DBMS) or simply a database. Many different types of databases are known, but the most common is usually called a relational database, which organizes data in tables that have rows, which represent individual entries, tuples, or records in the database, and columns, fields, or attributes, which define what is stored in each entry, tuple, or record. Each table has a unique name or identifier within the database and each column has a unique name within the particular table. The database also has one or more indexes, which are data structures that inform the DBMS of the location of a certain row in a table given an indexed column value, analogous to a book index informing the reader of the page on which a given word appears.

The most common way to retrieve data from a database is through statements called database queries, which may originate from user interfaces, application programs, or remote computer systems, such as clients or peers. A query is an expression evaluated by the DBMS, in order to retrieve data from the database that satisfies or meets the criteria or conditions specified in the query. Although the query requires the return of a particular data set in response, the method of query execution is typically not specified by the query. Thus, after the DBMS receives a query, the DBMS interprets the query and determines what internal steps are necessary to satisfy the query. These internal steps may comprise an identification of the table or tables specified in the query, the row or rows selected in the query, and other information such as whether to use an existing index, whether to build a temporary index, whether to use a temporary file to execute a sort, and/or the order in which the tables are to be joined together to satisfy the query. When taken together, these internal steps are referred to as a query plan (QP), a query execution plan (QEP), a query access plan (QAP), or an access plan (AP). The DBMS often saves the query plan and reuses it when the user or requesting program repeats the query, which is a common occurrence, instead of undergoing the time-consuming process of recreating the query plan.

SUMMARY

A method, computer-readable storage medium, and computer system are provided. In an embodiment, a first query is received that specifies a first object identifier. If a first query plan exists that implements the first query, except that the first query plan does not comprise the first object identifier and instead comprises a parameter marker in place of the first object identifier, a first query execution plan is created from the first query plan, substituting the first object identifier in the first query execution plan for the parameter marker, and the first query execution plan is executed to read a first object identified by the first object identifier.

It is to be noted, however, that the appended drawings illustrate only example embodiments of the invention, and are therefore not considered a limitation of the scope of other embodiments of the invention.

DETAILED DESCRIPTION

Figure 1:
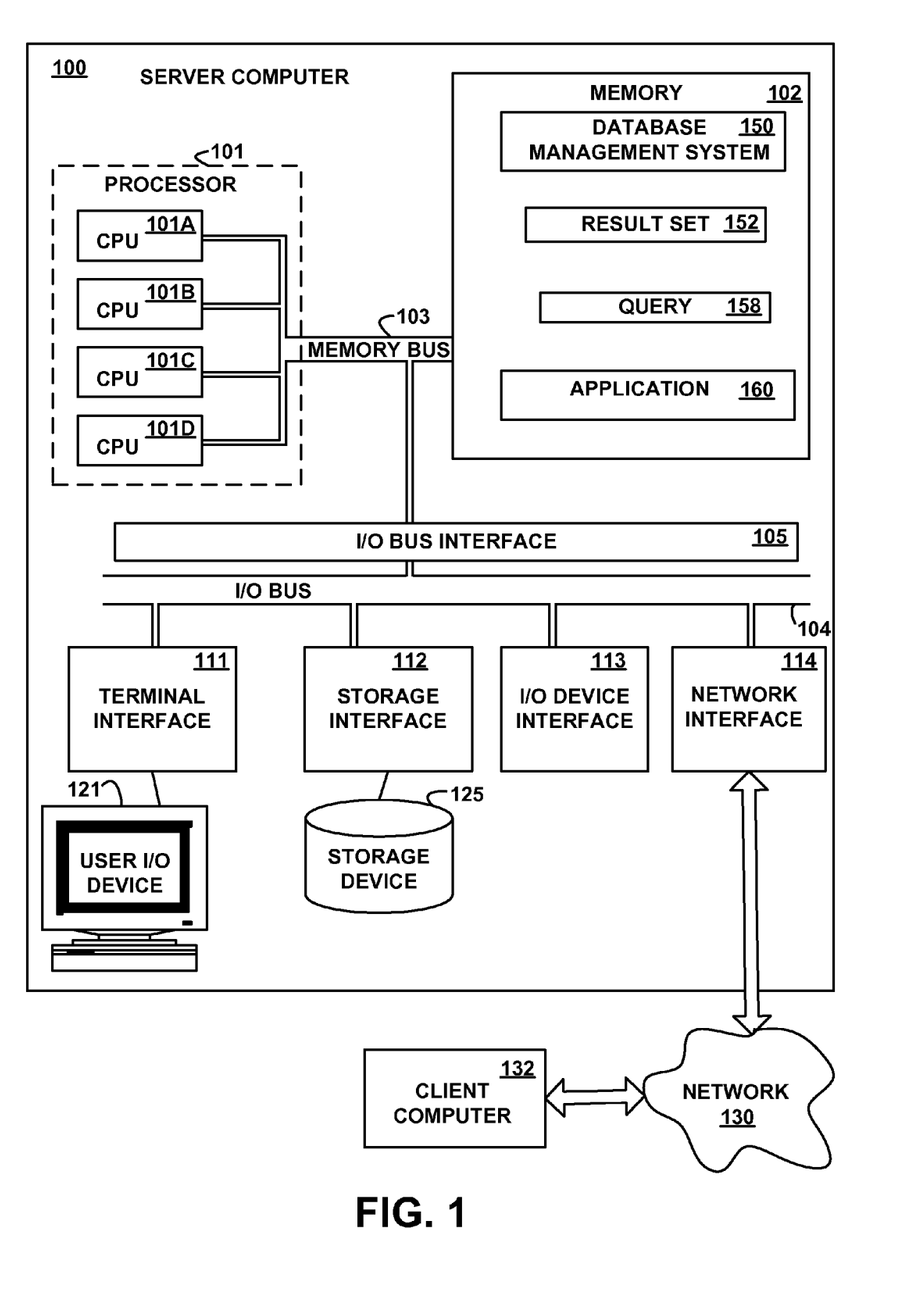
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to a client computer system 132 via a network 130, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system.

The major components of the server computer system 100 comprise one or more processors 101, a memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105.

The server computer system 100 contains one or more general-purpose programmable central processing units (CPUs) 101A, 101B, 101C, and 101D, herein generically referred to as the processor 101. In an embodiment, the server computer system 100 contains multiple processors typical of a relatively large system; however, in another embodiment the server computer system 100 may alternatively be a single CPU system. Each processor 101 executes instructions stored in the memory 102 and may comprise one or more levels of on-board cache.

In an embodiment, the memory 102 may comprise a random-access semiconductor memory, storage device, or storage medium (either volatile or non-volatile) for storing or encoding data and programs. In another embodiment, the memory 102 represents the entire virtual memory of the server computer system 100, and may also include the virtual memory of other computer systems coupled to the server computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system (DBMS) 150, a result set 152, a query 158, and an application 160. Although the database management system 150, the result set 152, the query 158, and the application 160 are illustrated as being contained within the memory 102 in the server computer system 100, in other embodiments some or all of them may be on different computer systems and may be accessed remotely, e.g., via the network 130. For example, the database management system 150, the result set 152, the query 158, and the application 160 may be stored in memory in the client computer 132. The server computer system 100 may use virtual addressing mechanisms that allow the programs of the server computer system 100 to behave as if they only have access to a large, single storage entity instead of access to multiple, smaller storage entities. Thus, while the database management system 150, the result set 152, the query 158, and the application 160 are illustrated as being contained within the memory 102, these elements are not necessarily all completely contained in the same storage device at the same time. Further, although the database management system 150, the result set 152, the query 158, and the application 160 are illustrated as being separate entities, in other embodiments some of them, portions of some of them, or all of them may be packaged together.

In an embodiment, the DBMS 150 and/or the application 160 comprise instructions or statements that execute on the processor 101 or instructions or statements that are interpreted by instructions or statements that execute on the processor 101, to carry out the functions as further described below with reference to FIGS. 2, 3, 4, 5, 6, 7, and 8. In another embodiment, the DBMS 150 and/or the application 160 are implemented in hardware via semiconductor devices, chips, logical gates, circuits, circuit cards, and/or other physical hardware devices in lieu of, or in addition to, a processor-based system. In an embodiment, the DBMS 150 and/or the application 160 comprise data, in addition to instructions or statements.

The memory bus 103 provides a data communication path for transferring data among the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the server computer system 100, and may receive output data via the user output devices. For example, a user interface may be presented via the user I/O device 121, such as displayed on a display device, played via a speaker, or printed via a printer.

The storage interface unit 112 supports the attachment of one or more disk drives or direct access storage devices 125 (which are typically rotating magnetic disk drive storage devices, although they could alternatively be other storage devices, including arrays of disk drives configured to appear as a single large storage device to a host computer). In another embodiment, the storage device 125 may be implemented via any type of secondary storage device. The contents of the memory 102, or any portion thereof, may be stored to and retrieved from the storage device 125, as needed. The I/O device interface 113 provides an interface to any of various other input/output devices or devices of other types, such as printers or fax machines. The network adapter 114 provides one or more communications paths from the server computer system 100 to other digital devices and computer systems 132; such paths may comprise, e.g., one or more networks 130.

Although the memory bus 103 is shown in FIG. 1 as a relatively simple, single bus structure providing a direct communication path among the processors 101, the memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the server computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the server computer system 100 is a multi-user mainframe computer system, a single-user system, or a server computer or similar device that has little or no direct user interface, but receives requests from other computer systems (clients). In other embodiments, the server computer system 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the server computer system 100 and the computer system 132. In various embodiments, the network 130 may represent a storage device or a combination of storage devices, either connected directly or indirectly to the server computer system 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN).

In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

The client computer system 132 may comprise some or all of the hardware and/or computer program elements of the server computer system 100. In an embodiment, the application 160 may be stored in a storage device at the client computer 132, may execute on a processor at the client computer 132, and may send the queries 158 to and receive the result sets 152 from the server computer system 100 via the network 130.

FIG. 1 is intended to depict the representative major components of the server computer system 100, the network 130, and the client computer system 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs."

The computer programs comprise one or more instructions or statements that are resident at various times in various memory and storage devices in the server computer system 100 and that, when read and executed by one or more processors in the server computer system 100 or when interpreted by instructions that are executed by one or more processors, cause the server computer system 100 to perform the actions necessary to execute steps or elements comprising the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

Figure 2:
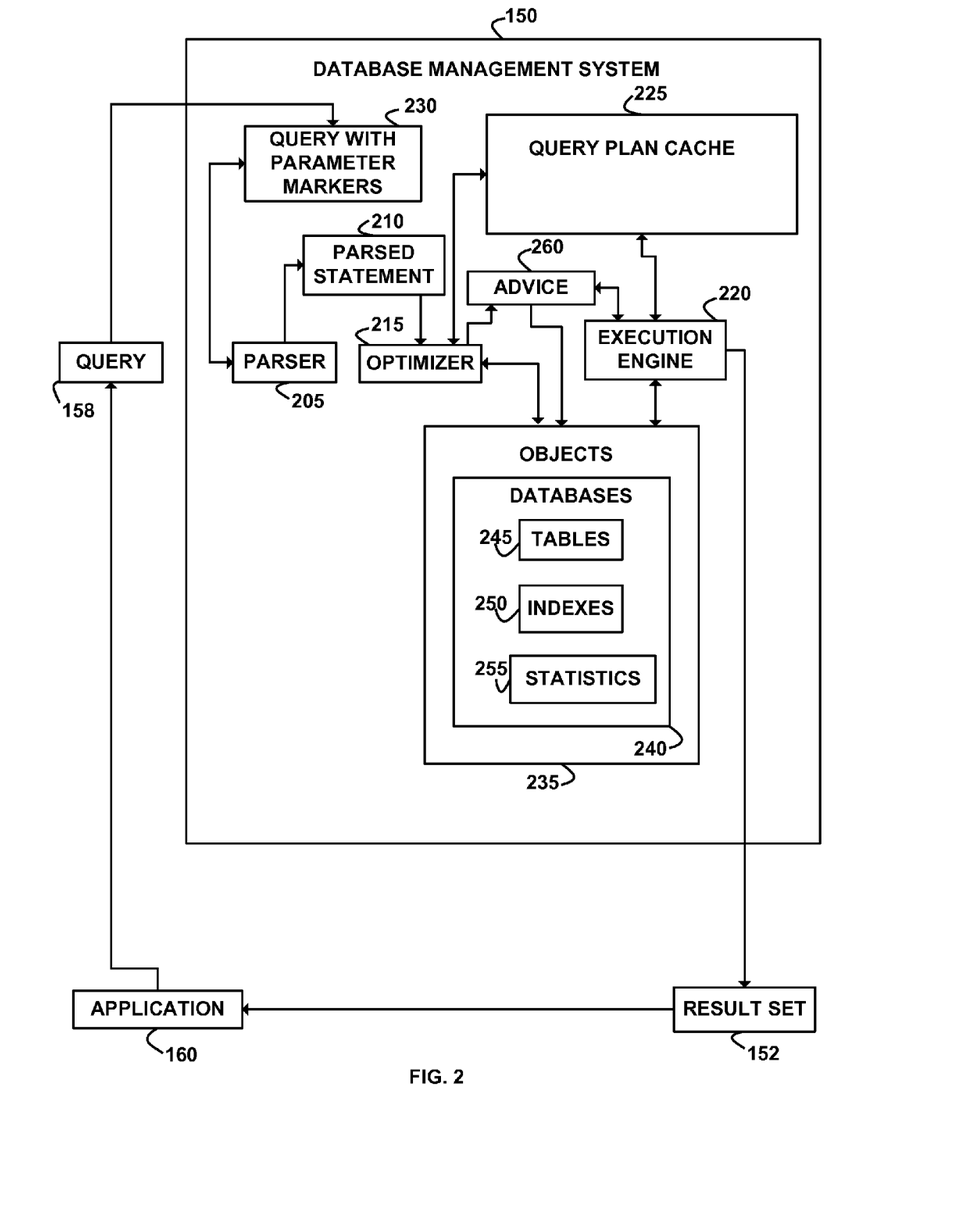
FIG. 2 depicts a block diagram of an example database management system, according to an embodiment of the invention.

FIG. 2 depicts a block diagram of an example database management system 150, according to an embodiment of the invention. The DBMS 150 comprises a parser 205, a parsed statement 210, an optimizer 215, an execution engine 220, a query plan cache 225, a query with parameter markers 230, objects 235, and advice 260. Multiple objects 235 exist, each of which comprises or is assigned a database 240, which comprise tables 245, indexes 250, and statistics 255. In various embodiments, the objects 235 are implemented as computer systems, schemas, libraries, directories, subdirectories, catalogs, files, UDFs (User Defined Functions) or translate tables, such as code pages, NLS (National Language Support) files, CCSIDs (Coded Character Set Identifiers), or sort sequence tables that either comprise the databases 240, are assigned to respective databases 240, or are specified or identified by the queries 158. The query plan cache 225 stores query plans and query execution plans. The tables 245 organize data in rows, which represent individual entries, tuples, or records and columns, fields, or attributes, which define what is stored in each row, entry, tuple, or record. Each table 245 has a unique name or identifier within the database 240 (but not necessarily a unique name across all objects) and each column has a unique name within the particular table 245. The indexes 250 are data structures that inform the DBMS 150 of the location of a certain row in a table 245, in response to the indexes 250 receiving an indexed column value. In various embodiments, examples of the statistics 255 comprise a summary of the data values in the rows, a frequent values list (e.g., a list of the values that exist most frequently in a table), a unique value count (e.g., a count for value of the number of times that the value exists in the table and/or column), or a histogram of the values (e.g., a count of the number of times that each value exists in the table or column). The optimizer 215 may use the statistics 255 to pick the best query plan for the query 158.

The parser 205 in the DBMS 150 receives the query 158 from the application 160. The query 158 requests that the DBMS 150 search for or find a row or combination of rows of data from the tables 245 and store the data from those found rows into the result set 152 that meet or satisfy the criteria, keys, and or values specified by the query 158. In an embodiment, the application 160 sends the same query 158 multiple times to the DBMS 150, which may or may not result in a different result set 152, depending on whether the data in the DBMS 150 has changed between occurrences of the query 158 or whether different values are passed into the query 158 via parameter markers or host variables. In an embodiment, the application 160 sends different queries 158 to the DBMS 150. The parser 205 optionally adds parameter markers to the query, creating the query with parameter markers 230 and generates a parsed statement 210 from the query 158 or query with parameter markers 230, which the parser 205 sends to the optimizer 215. The optimizer 215 performs query optimization on the parsed statement 210. As a result of query optimization, the optimizer 215 generates one or more query plans, using data such as the statistics 255, resource availability, platform capabilities, query content information, etc., that is stored in the database 240. Once generated, the optimizer 215 stores the query plans in the query plan cache 225. The execution engine 220 reads a query plan from the query plan cache 225 and builds a query execution plan from the query plan. The execution engine 220 then executes the query execution plan, using the indexes 250, in order to find and retrieve the data from the tables 245 that satisfies the criteria of the query 158. The execution engine 220 stores the resultant data that satisfies the criteria specified by the query 158 into the result set 152, which the DBMS 150 returns to the application 160, as a response to the query 158. In an embodiment, the DBMS 150 stores various thresholds into the query plans. The DBMS 150 may receive the various thresholds from the application 160, from a user, or from a database administrator, or the thresholds may be set by a designer of the optimizer 215.

Although FIG. 2 illustrates the query plan cache 225 as being contained within the DBMS 150, in another embodiment, the application 160 comprises the query plan cache 225. In various embodiments, each application 160 has its own query plan cache 225 within the respective application 160, each application 160 has its own query plan cache 225 outside the respective application 160, or the applications 160 share the same query plan cache 225. The query plan cache 225 may be scoped system wide, application wide, object wide, to a thread, or any other scoping criteria. In various embodiments, the application 160 is a user application, a third-party application, an operating system, or any portion, multiple, or combination thereof. In an embodiment, the query plan cache 225 may be in an SQL (Structured Query Language) package. In various embodiment, the query plan cache 225 may be stored on the same server computer system 100 as the DBMS 150, may execute in the same or a different virtual machine as the DBMS 150, or may be stored on a different computer from the DBMS 150 and accessed, e.g., via the network 130.

In an embodiment, the optimizer 215 or the execution engine 220 creates the advice 260 by reading the indexes 250 that were used by the query plans that have the fastest execution time and recommends that those indexes be built for query plans that do not use the indexes. In an embodiment, the execution engine 220 creates the advice 260 by determining that a query reads a column from a table for which statistics 255 do not exist, and in response, advising to create statistics 255 that characterize or describe the column. In other embodiments, any appropriate technique may be used for creating the advice 260.

Figure 3:
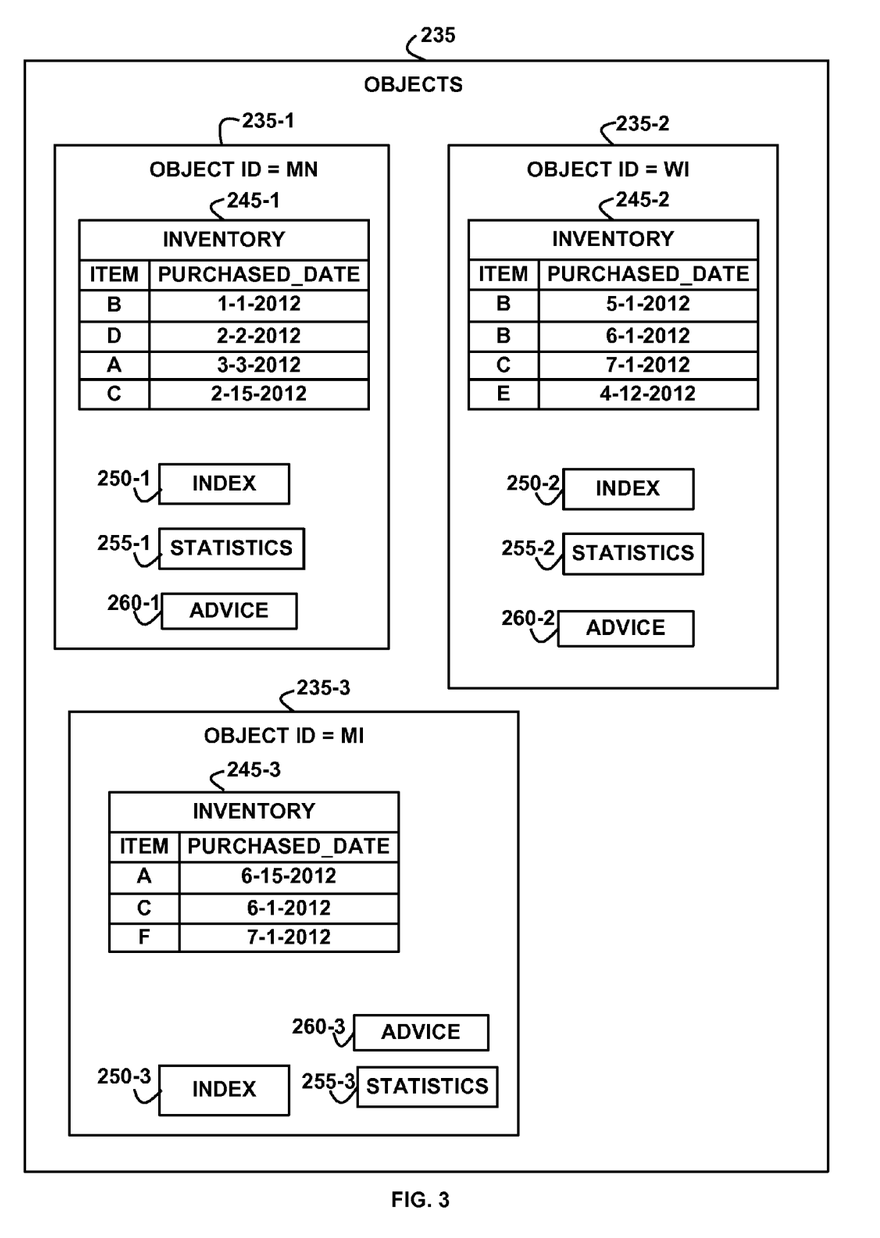
FIG. 3 depicts a block diagram of an example data structure for objects, according to an embodiment of the invention.

FIG. 3 depicts a block diagram of an example data structure for the objects 235, according to an embodiment of the invention. The objects 235 comprise example objects 235-1, 235-2, and 235-3, any or all of which are generically referred to as the objects 235. In various embodiments, the example objects 235-1, 235-2, and 235-3 comprise or are assigned to respective tables 245-1, 245-2, and 245-3, respective indexes 250-1, 250-2, and 250-3, respective statistics 255-1, 255-2, and 255-3, and respective advice 260-1, 260-2, and 260-3. The tables 245-1, 245-2, and 245-3 are examples of, and are generically referred to by, the tables 245. The indexes 250-1, 250-2, and 250-3, are examples of, and are generically referred to by, the indexes 250. The statistics 255-1, 255-2, and 255-3 are examples of, and are generically referred to by, the statistics 255. The advice 260-1, 260-2, and 260-3 are examples of, and are generically referred to by, the advice 260.

In an embodiment, some or all of the tables 245-1, 245-2, and 245-3 have identical table identifiers (e.g., all of the tables 245-1, 245-2, and 245-3 have the same "inventory" table identifier) and comprise identical column identifiers or names (e.g., all of the tables 245-1, 245-2, and 245-3 comprise the same "item" and "purchased_date" column identifiers). In an embodiment, the data values in the rows of the tables 245-1, 245-2, and 245-3, in the different objects 235-1, 235-2, and 235-3 are the same or different, and the tables 245-1, 245-2, and 245-3 may have the same or different number of rows.

Figure 4:
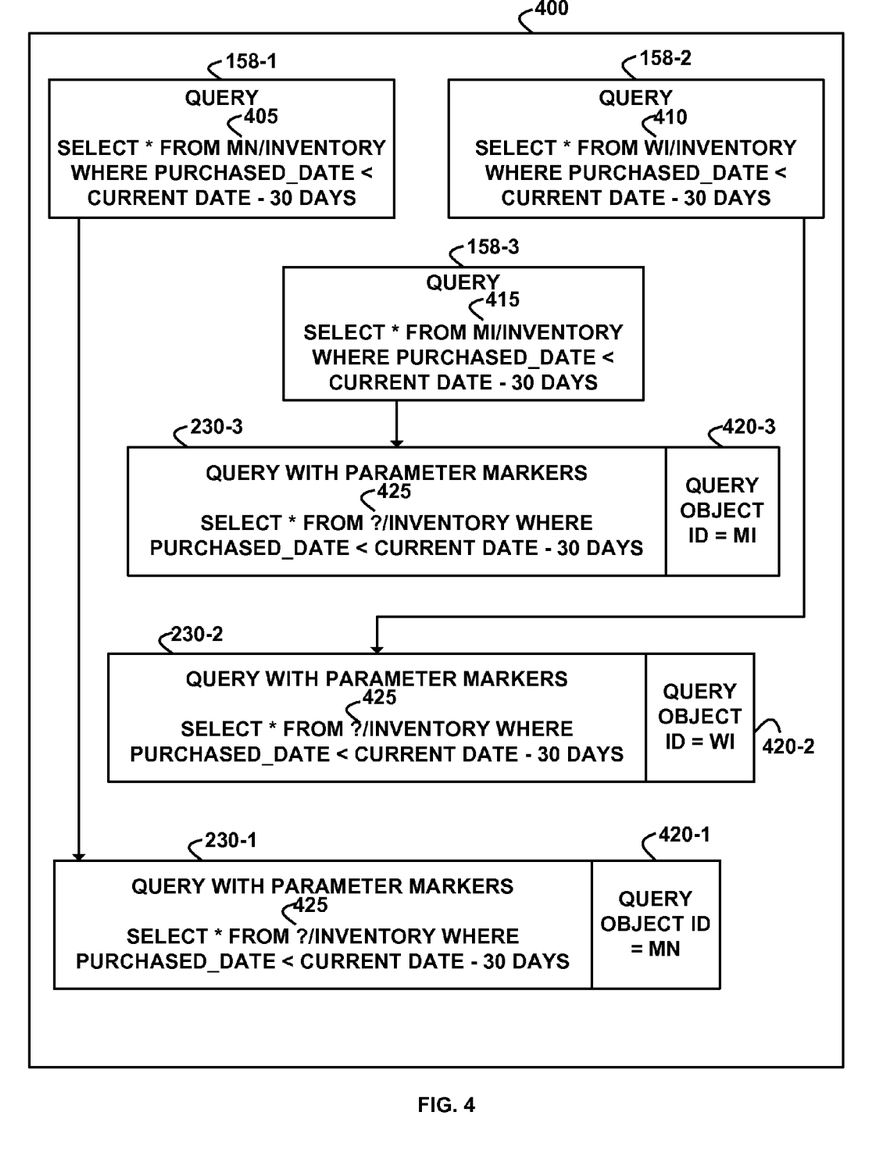
FIG. 4 depicts a block diagram of example queries and queries with parameter markers, according to an embodiment of the invention.

FIG. 4 depicts a block diagram 400 of example queries 158-1, 158-2, and 158-3 and queries with parameter markers 230-1, 230-2, and 230-3, according to an embodiment of the invention. The queries 158-1, 158-2, and 158-3 are examples of, and are generically referred to by the query 158. The queries with parameter markers 230-1, 230-2, and 230-3 are examples of, and are generically referred to by, the queries with parameter markers 230. The DBMS 150 copies the query 158-1 to the query with parameter markers 230-1, copies the object identifier 405 from the query 158-1 to the query object identifier 420-1, which is assigned to the query with parameter markers 230-1, and replaces the object identifier in the query with parameter markers 230-1 with a parameter marker 425. The DBMS 150 further copies the query 158-2 to the query with parameter markers 230-2, copies the object identifier 410 from the query 158-2 to the query object identifier 420-2, which is assigned to the query with parameter markers 230-2, and replaces the object identifier in the query with parameter markers 230-2 with a parameter marker 425. The DBMS 150 further copies the query 158-3 to the query with parameter markers 230-3, copies the object identifier 415 from the query 158-3 to the query object identifier 420-3, which is assigned to the query with parameter markers 230-3, and replaces the object identifier in the query with parameter markers 230-3 with a parameter marker 425. In an embodiment, a parameter marker 425 is implemented as a question mark ("?"), but in other embodiments, any appropriate symbol, character, tag, or identifier may be used. Thus, the query object identifiers 420-1, 420-2, and 420-3 are the object identifiers that were replaced with the parameter marker 425. In an embodiment, a parameter marker replaces both an identifier of a computer system and a object identifier. In an embodiment, multiple parameter markers exist, one parameter marker that replaces a computer system identifier and another parameter marker that replaces an object identifier.

Figure 5:
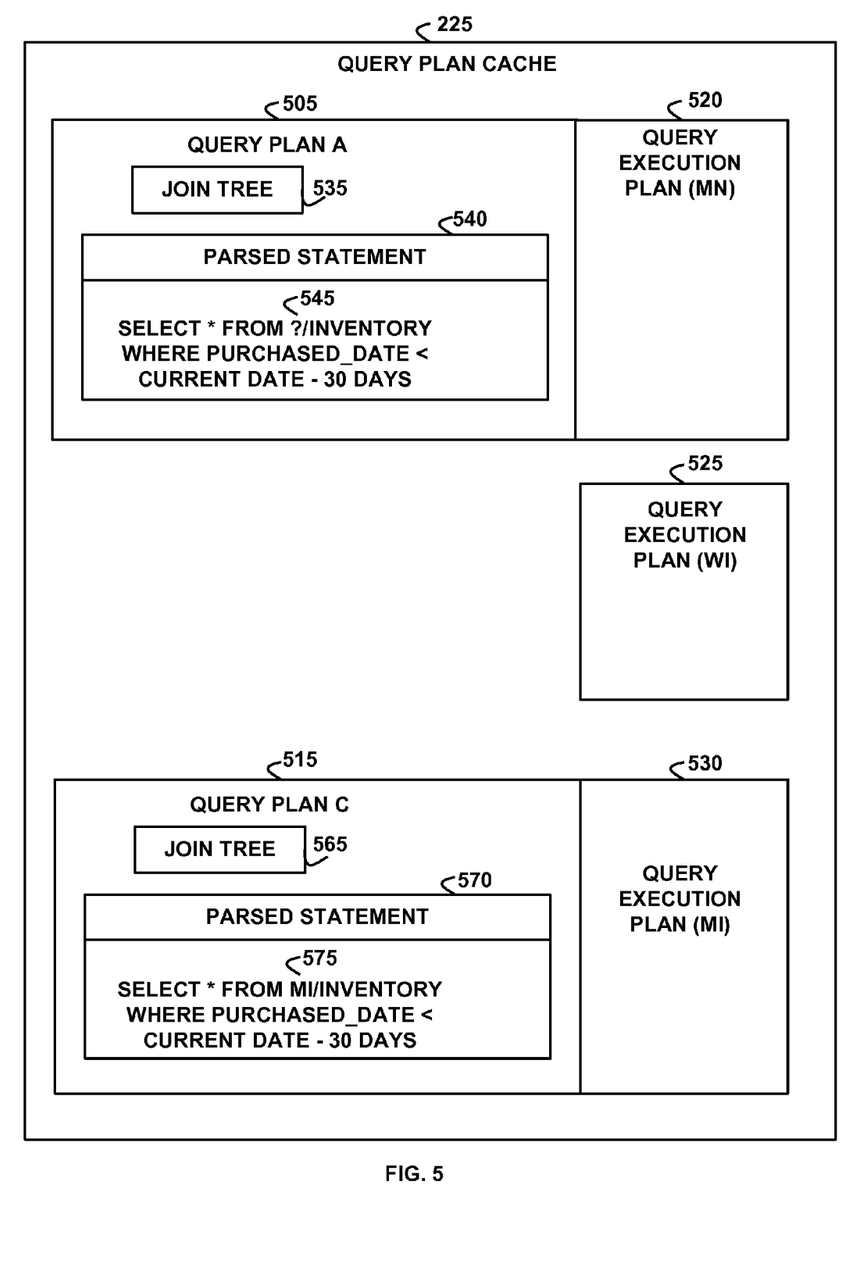
FIG. 5 depicts a block diagram of an example data structure for a query plan cache, according to an embodiment of the invention.

FIG. 5 depicts a block diagram of an example data structure for a query plan cache 225, according to an embodiment of the invention. The query plan cache 225 stores the example query plan (QP) A 505, the query plan C 515, the query execution plan 520, the query execution plan 525, and the query execution plan 530. The query plan A 505 comprises an example join tree 535 and a parsed statement 540 that comprises a parameter marker 545 in place of a object identifier (at the location of a object identifier that has been replaced). The query plan C 515 comprises a join tree 565 and a parsed statement 570 that comprises a object identifier 575, which has not been replaced by a parameter maker.

The join trees 535 and 565 specify the respective internal steps that the DBMS 150 takes, in order to create the result set 152 that satisfies or meets the criteria specified by the query 158. These internal steps may comprise an identification of the table or tables specified in the query 158, the values in the row or rows to be selected by the query 158, and other information such as whether to use an existing index, whether to build a temporary index, whether to scan each table (read the table in storage address order) or use an index to randomly access the table, whether to use a temporary file to execute a sort or hash, and/or the order in which the tables are to be joined together to satisfy the query 158. In response to a query 158 that requests data from multiple tables, the DBMS 150 joins tuples from these multiple tables (the tuples are often concatenated horizontally in the result set 152) in a join order, so as to find and retrieve the data from all the tables. Thus, a join operation is a relationship between two tables accessed by a query (a join query), and the DBMS 150 performs a join operation to connect (or join) data from two or more tables, wherein the DBMS 150 joins together the tuples with matching attributes, in order to form a new tuple. The join order is the order in which the DBMS 150 performs the join operations, in order to retrieve and join rows of data from the database tables into the result set 152. In an embodiment, the join trees 535 and 565 are represented as tree graphs with nodes that identify tables used by the query and connections between the nodes that identify the join order of the rows returned from the tables. In other embodiments, the join trees 535 and 565 may be represented via any appropriate technique.

Join operations are typically implemented using a nested loop algorithm, where the DBMS 150 joins resultant new tuples from the first two tables in the join order to the resultant tuples from the third table, and then the DBMS 150 joins those results to the fourth table, etc. Eventually all of the needed join operations are complete, and the resultant new tuples are the result set 152, which satisfies or meets the criteria specified by the query 158. In other embodiments, join operations may be implemented via any appropriate technique.

Because a single join is limited to accessing two tables, the DBMS 150 may perform multi-table joins in sequence, according to a particular order. The DBMS 150 may, e.g., implement many different join queries in multiple query plans by joining the tables in any of several possible join orders, all of which implement the same query. For example, a query that involves joining tables A, B, and C can often be performed as a join of table A and B followed by a join of table A and C. Alternatively, in many instances, the same query can be performed as a join of table A and C followed by the join of table A and B. The DBMS 150 attempts to select a join order that eliminates the greatest number of records from the potential result set early in the join processing, which saves the costs associated with repeatedly accessing tables later in the join operation.

Query plans may comprise other information, such as metadata that specify selection criteria that the DBMS 150 uses to select the query plan that implements a particular query from among multiple query plans that all implement the same query. Query plans may further comprise statistics that characterize the last execution of the query plan. Examples of metadata are the parsed statements 540 and 570, which comprise a copy of the parsed statement from the query 158 that the respective query plan 505 or 515 implements. Metadata may also comprise an identifier of an index used by the query plan. In response to receiving a query 158, the DBMS 150 searches the metadata in the various query plans in the query plan cache 225 for metadata that specifies a query that is identical to the received query 158. If multiple query plans are found with metadata that specify queries that are identical to the received query 158, then the DBMS 150 may estimate the number of rows that the index in the database specified by the metadata returns, when executed, and compare the estimated number of rows to statistics stored in the same query plan. The statistics, in this example, identify the actual number of rows that the index returned the most recent time that the query plan was executed. The DBMS 150 then selects the query plan whose statistics most closely match the estimate.

The query execution plans (QEPs) 520, 525, and 530 are instantiated versions of query plans, which are written in a machine language, with the parameter values of the object identifiers (e.g., "MN," "WI," or "MI") resolved to actual pointers to the objects and substituted for the parameter marker 545. Thus, both query execution plans 520 and 525 are instantiated from the same query plan 505, which, in an embodiment, obviates the need for a separate query plan for each object and saves memory space in the query plan cache 225. In an embodiment, the DBMS 150 deletes the query execution plans 520, 525, and 530 after execution. In another embodiment, the DBMS 150 saves or retains the query execution plans 520, 525, and 530 after execution. The DBMS 150 saves or retains the query plans 505 and 515 after the query execution plans 520, 525, and 530 are executed and does not delete the query plans 505 and 515. Thus, the query plans 505 and 515 are available for the next query whose parsed statement is identical to the parsed statement in the query plan, with the exception of the parameter marker 545 if present.

Figure 6:
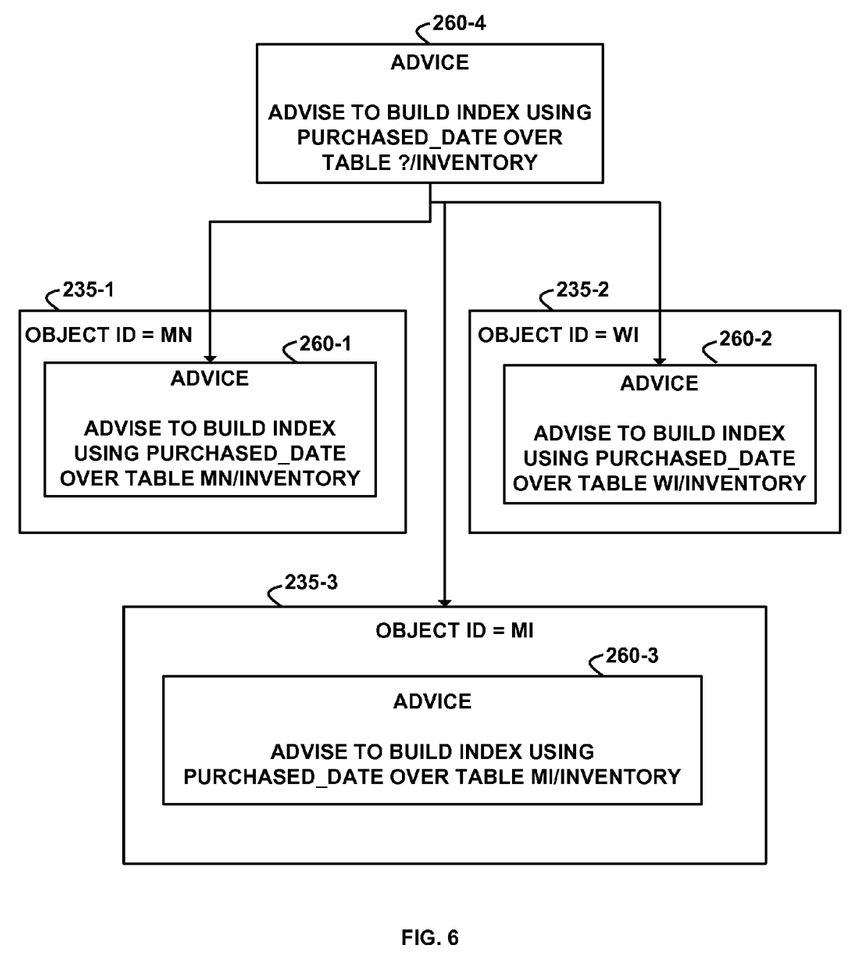
FIG. 6 depicts a block diagram of example advice, according to an embodiment of the invention.

FIG. 6 depicts a block diagram of the broadcasting of example advice 260-4 to multiple objects 235-1, 235-2, and 235-3, according to an embodiment of the invention. The DBMS 150 creates the example advice 260-4, which comprises a parameter marker in place of a object identifier. In various embodiments, the advice 260-4 advises which index is advantageous to build, over which tables to build the index, which query plan to select in response to a particular query, or which statistics to collect for which column in a table. The DBMS 150 broadcasts, sends, or stores the advice to multiple objects, such as the objects 235-1, 235-2, and 235-3, where the DBMS 150 stores the advice 260-4 as the respective advice 260-1, 260-2, and 260-3, after replacing the parameter marker in the advice with the object identifier that identifies the respective object. The DBMS 150, or an administrator, may then read the respective advice 260-1, 260-2, and 260-3 from the respective objects 235-1, 235-2 and 235-3, and implement or carry out the respective advice 260-1, 260-2, and 260-3, for example, by building the index in the object specified by the object identifier or by saving the statistics over the column specified by the advice. In this way, the advice 260-4, which the DBMS 150 built in response to, and as a result of, the execution of a particular query execution plan that read from a table in a particular object is sent to all objects that comprise or are assigned to a table with the same name, although the tables may have different data values in their respective rows.

Figure 7:
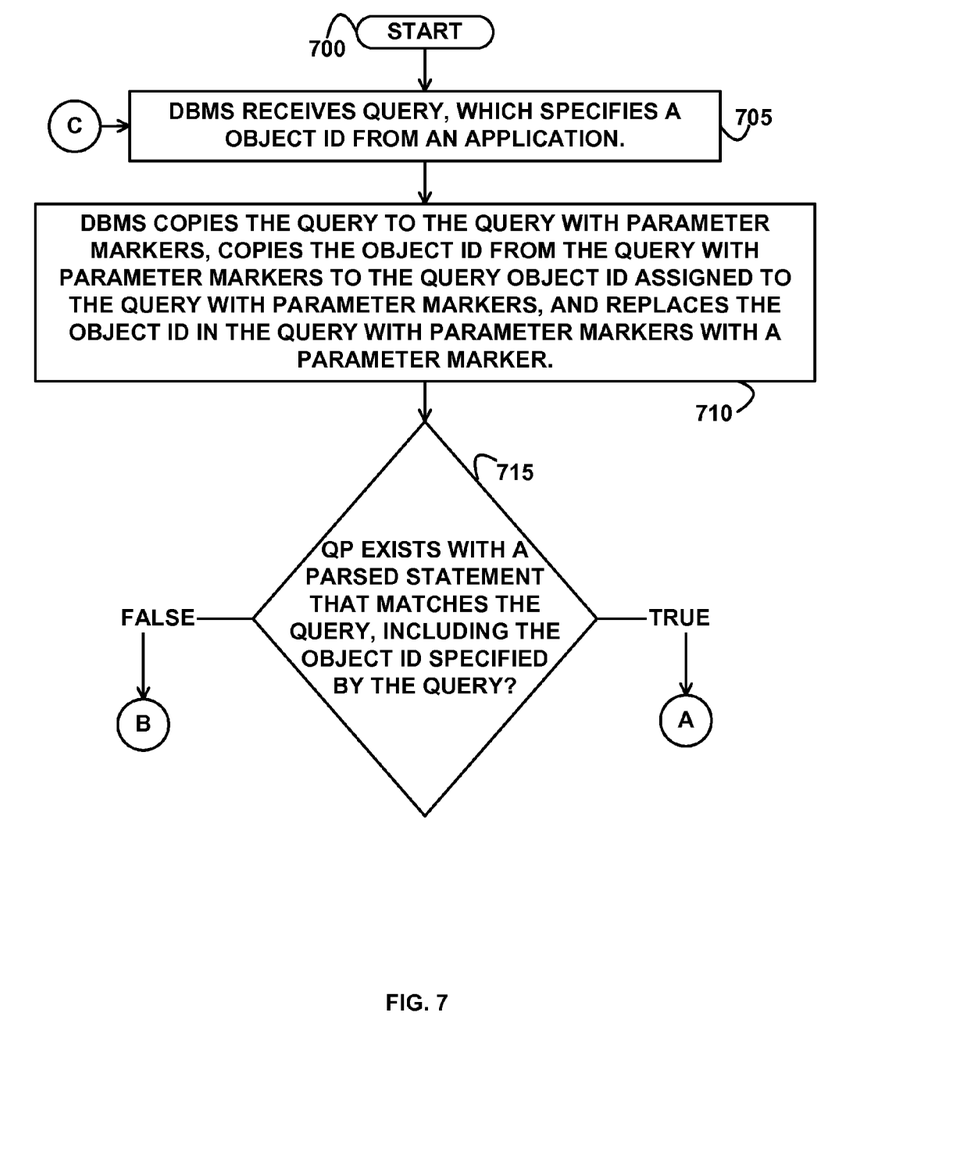
FIG. 7 depicts a flowchart of example processing for a query, according to an embodiment of the invention.

FIG. 7 depicts a flowchart of example processing for a query, according to an embodiment of the invention. Control begins at block 700. Control then continues to block 705 where the DBMS 150 receives a query (e.g., the query 158-1, 158-2, or 158-3) from the application 160. The query 158-1, 158-2, or 158-3 specifies a respective object identifier 405, 410, or 415, which identifies one of the objects 235, such as the object 235-1, the object 235-2, or the object 235-3. Control then continues to block 710 where the DBMS 150 reads the object identifier (e.g., the object identifier 405, 410, or 415) and saves the object identifier 405, 410, or 415 to the memory 102, e.g., as the query object identifier 420-1, 420-2, or 420-3. The DBMS 150 further creates the query with parameter markers 230-1, 230-2, or 230-3 from the respective query 158-2, 158-2, or 158-3 and replaces the object identifier in the query with parameter markers 230-1, 230-2, or 230-3 with the parameter marker 425, as previously described above with reference to FIG. 4.

Control then continues to block 715 where the DBMS 150 determines whether a query plan exists that contains a parsed statement that matches (is identical to) the received query, including the object identifier that was specified by the received query. For example, the query plan 515 contains the object identifier 575 that is identical to the object identifier 415 specified by the query 158-3 (causing the logic represented by block 715 to evaluate true), but the query plan 505 does not contain a object identifier that is identical to any query (causing the logic represented by block 715 to evaluate false) because query plan 505 contains the parameter marker 545 in place of a object identifier.

Figure 8:
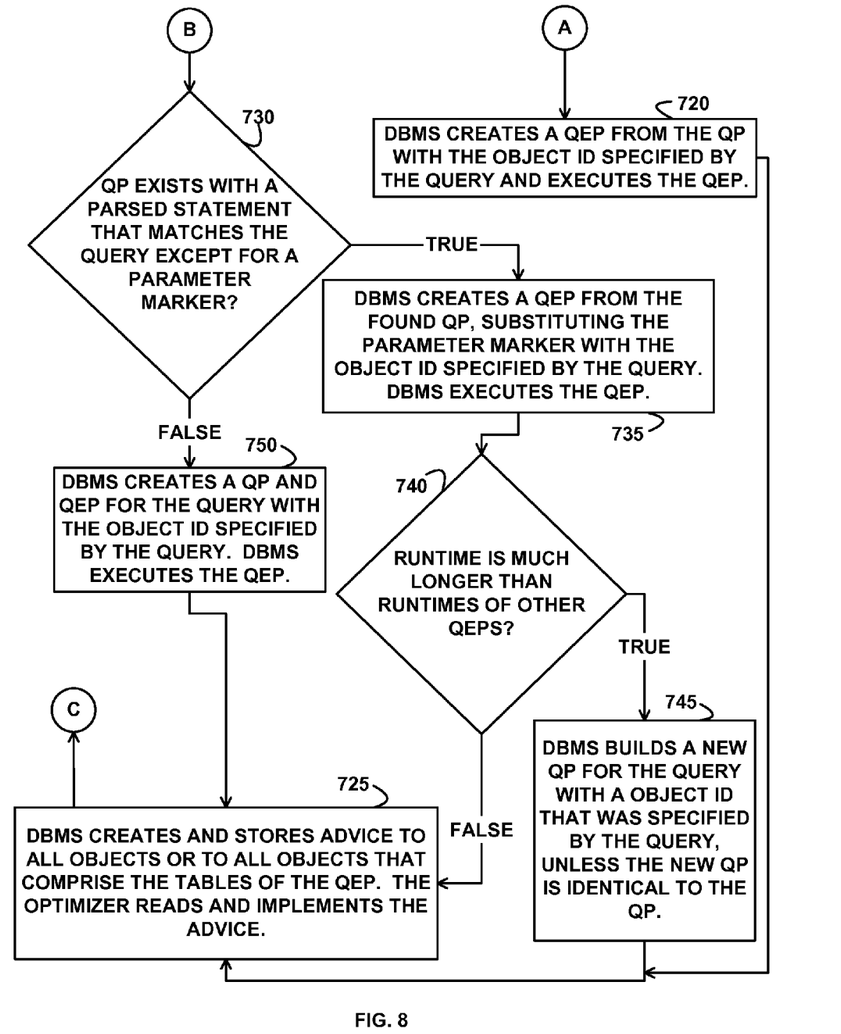
FIG. 8 depicts a flowchart of further example processing for a query, according to an embodiment of the invention.

If the determination at block 715 is true, then a query plan exists that contains a parsed statement that matches the query, including the object identifier that was specified by the query 158, so control continues to block 720 of FIG. 8 where the DBMS 150 creates a query execution plan from the found query plan, storing the object identifier 420-1, 420-2, or 420-3 specified by the query into the created query execution plan. The DBMS 150 further executes the query execution plan, storing rows that satisfy the criteria of the query to the result set 152. Control then continues to block 725 where the DBMS 150 builds or creates advice 260 based on the execution of the query execution plan that read the database from the object specified by the query execution plan. The DBMS 150 stores the parameter marker in the advice 260 in place of the object identifier. The DBMS 150 further stores the advice 260 to all objects or only to all objects that comprise or are assigned to the tables with the same table identifier as the table identifier specified by the query execution plan. The optimizer 215 or a database administrator reads and implements the advice 260, replacing the parameter marker in the advice 260 with the object identifier that identifies the object in which the advice 260 is stored or assigned. For example, if the advice 260 advises to build or create an index over a table, then the optimizer 215 builds or creates indexes over the tables (with the same table identifier) in each object, even including the tables that exist in objects not specified by the query execution plan that was executed by the logic of block 720. As another example, if the advice 260 advises to create statistics for a column in a table, then the optimizer 215 collects and saves statistics for columns in all tables (with the same table identifier) in each object, even including the tables that exist in objects not specified by the query execution plan that was executed by the logic of block 720. In various embodiments, the objects in which the advice 260 is implemented may have the same or a different object identifier as the object identifier specified by the query that caused the query plan (from which the query execution plan was built) to be built. Control then returns to block 705 where the DBMS 150 receives the same or a different query that specifies the same or a different object from the same or a different application, as previously described above.

If the determination at block 715 is false, then a query plan does not exist that contains a parsed statement that matches the query, including the object identifier that was specified by the query, so control continues to block 730 of FIG. 8 where the DBMS 150 determines whether a query plan exists that contains a parsed statement that matches the query except that the query plan contains a parameter marker instead of, and in the same place as, the object identifier of the query, i.e., the DBMS 150 determines whether a query plan exists that contains a parsed statement that matches the query with parameter markers 230 that was created from the received query. For example, if the received query was the query 158-1, the query 158-2, or the query 158-3, they all match the parsed statement 540 in the query plan A 505, with the exception of the parameter marker 545 in place of the object identifier (i.e., the query with parameter markers 230-1, 230-2, and 230-3 all match the parsed statement 540), so the determination at block 730 is true, for those examples.

If the determination at block 730 is true, then a query plan exists that contains a parsed statement that matches the query except that the query plan contains a parameter marker instead of, and in the same place as, the object identifier of the query, so control continues to block 735 where the DBMS 150 creates (and stores to the memory 102) a query execution plan from the found query plan, substituting the parameter marker with the object identifier specified by the query at the location of the parameter marker. The DBMS 150 further executes the query execution plan, returning and storing rows from the table that satisfy the criteria of the query to the result set 152. The DBMS 150 returns the rows from the table that is contained in the object that is identified by the object identifier that was substituted for the parameter marker and does not return rows from other tables in other objects. In an embodiment, the DBMS 150 creates the query execution plan from the found query plan that was created from a previous query that specified a different object identifier than the object identifier specified by the current query. In another embodiment, the object identifiers specified by the previous query and the current query are identical.

Control then continues to block 740 where the DBMS 150 determines whether the run time (the elapsed time of execution) of the current query execution plan is significantly longer (longer by more than a threshold amount) than run times of other query execution plans that implement the same query, except that the object identifiers of the other query execution plans are different than the current query execution plan.

If the determination at block 740 is true, then the run time (the elapsed time of execution) of the current query execution plan is significantly longer (longer by more than a threshold amount) than run times of other query execution plans that implement the same query (same, except that the object identifiers of the other query execution plans are different than the current query execution plan), so control continues to block 745 where the DBMS 150 builds (and stores to the memory 102) a new query plan for the query with a object identifier (e.g., the object identifier 575) that was specified by the query if the new query plan is not identical to the query plan whose query execution plan was executed. If the new query plan is identical to the query plan that was executed, the DBMS 150 does not build the new query plan or deletes the new query plan after building it. Control then continues to block 725 where the DBMS 150 creates advice based on the execution of the query execution plan that read the database from the object specified by the query execution plan. The DBMS 150 further stores the advice to all objects or to all objects that comprise the tables specified by the query execution plan. The optimizer or a database administrator reads and implements the advice. For example, if the advice advises to build or create an index over a table, the optimizer builds or creates indexes over the tables in each object (and stores them to the memory 102), even including the tables that exist in objects not specified by the query execution plan that was executed by the logic of block 735. Control then returns to block 705 where the DBMS 150 receives the same or a different query that specifies the same or a different object from the same or a different application, as previously described above.

If the determination at block 740 is false, then the run time (the elapsed time of execution) of the current query execution plan is not significantly longer (is not longer by more than a threshold amount) than run times of other query execution plans that implement the same query (same, except that the object identifiers of the other query execution plans are different than the current query execution plan), so control continues to block 725, as previously described above, without building a new query plan.

If the determination at block 730 is false, then a query plan does not exist that contains a parsed statement that matches the query, and any query plans that exist contain parsed statements that are different from the query and that difference is more than a substitution of a parameter marker for a object identifier, so control continues to block 750 where the DBMS 150 creates, and stores to the memory 102, a query plan and a query execution plan for the query with the object identifier specified by the query. The DBMS 150 further executes the query execution plan. Control then continues to block 725 where the DBMS 150 creates advice based on the execution of the query execution plan that read the database from the object specified by the query execution plan. The DBMS 150 further stores the advice to all objects or to all objects that comprise the tables specified by the query execution plan. The optimizer or a database administrator reads and implements the advice. For example, if the advice advises to create an index over a table, the optimizer creates indexes over the tables in each object, even the tables that exist in objects not specified by the query execution plan that was executed by the logic of block 750. Control then returns to block 705 where the DBMS 150 receives the same or a different query that specifies the same or a different object from the same or a different application, as previously described above.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense.

What is claimed is:

1. A method comprising:
   receiving a first query that specifies a first object identifier; and
   if a first query plan exists that implements the first query, except that the first query plan does not comprise the first object identifier and instead comprises a parameter marker in place of the first object identifier, creating a first query execution plan from the first query plan, substituting the first object identifier in the first query execution plan for the parameter marker, and executing the first query execution plan to read a first object identified by the first object identifier;
   if a run time of the execution of the first query execution plan is more than a threshold amount longer than run times of all other query execution plans that match the first query execution plan except for the object identifier, building a new query plan for the first query, wherein the new query plan comprises the first object identifier; and
   if the new query plan is identical to the first query plan except that the new query plan comprises the first object identifier in place of the parameter marker, deleting the new query plan.

2. The method of claim 1, wherein the first query plan was created in response to receipt of a second query that specified a second object identifier, wherein the first object identifier and the second object identifier identify different objects.

3. The method of claim 2, further comprising:
   creating advice from execution of the first query execution plan;
   storing the advice to the first object; and
   storing the advice to a second object identified by the second object identifier.

4. The method of claim 3, wherein the creating the advice further comprises:
   storing the parameter marker in the advice in place of the first object identifier.

5. The method of claim 4, further comprising:
   reading the advice from the first object, replacing the parameter marker with the first object identifier, and implementing the advice to the first object.

6. The method of claim 4, further comprising:
   reading the advice from the second object, replacing the parameter marker with the second object identifier, and implementing the advice to the second object.

7. A non-transitory computer-readable storage medium encoded with instructions, wherein the instructions when executed comprise:
   receiving a first query that specifies a first object identifier;
   if a first query plan exists that implements the first query, except that the first query plan does not comprise the first object identifier and instead comprises a parameter marker in place of the first object identifier, creating a first query execution plan from the first query plan, substituting the first object identifier in the first query execution plan for the parameter marker, and executing the first query execution plan to read a first object identified by the first object identifier;
   if a run time of the execution of the first query execution plan is more than a threshold amount longer than run times of all other query execution plans that match the first query execution plan except for the object identifier, building a new query plan for the first query, wherein the new query plan comprises the first object identifier; and
   if the new query plan is identical to the first query plan except that the new query plan comprises the first object identifier in place of the parameter marker, deleting the new query plan.

8. The non-transitory computer readable storage medium of claim 7, wherein the first query plan was created in response to receipt of a second query that specified a second object identifier, wherein the first object identifier and the second object identifier identify different objects.

9. The non-transitory computer-readable storage medium of claim 8, further comprising:
   creating advice from execution of the first query execution plan;
   storing the advice to the first object; and
   storing the advice to a second object identified by the second object identifier.

10. The non-transitory computer-readable storage medium of claim 9, wherein the creating the advice further comprises:
    storing the parameter marker in the advice in place of the first object identifier.

11. The non-transitory computer-readable storage medium of claim 10, further comprising:
    reading the advice from the first object, replacing the parameter marker with the first object identifier, and implementing the advice to the first object.

12. The non-transitory computer-readable storage medium of claim 10, further comprising:

reading the advice from the second object, replacing the parameter marker with the second object identifier, and implementing the advice to the second object.

13. A computer comprising:
a processor; and
memory communicatively connected to the processor, wherein the memory is encoded with instructions, and wherein the instructions when executed by the processor comprise
receiving a first query that specifies a first object identifier,
if a first query plan exists that implements the first query, except that the first query plan does not comprise the first object identifier and instead comprises a parameter marker in place of the first object identifier, creating a first query execution plan from the first query plan, substituting the first object identifier in the first query execution plan for the parameter marker, and executing the first query execution plan to read a first object identified by the first object identifier, wherein the first query plan was created in response to receipt of a second query that specified a second object identifier, wherein the first object identifier and the second object identifier identify different objects,
creating advice from execution of the first query execution plan, wherein creating the advice further comprises storing the parameter marker in the advice in place of the first object identifier,
storing the advice to the first object,
storing the advice to a second object identified by the second object identifier, and
reading the advice from the first object, replacing the parameter marker in the advice from the first object with the first object identifier, and implementing the advice to the first object.

14. The computer of claim 13, wherein the instructions further comprise:
reading the advice from the second object, replacing the parameter marker in the advice from the second object with the second object identifier, and implementing the advice to the second object.

15. The computer of claim 13, wherein the instructions further comprise:
if a run time of the execution of the first query execution plan is more than a threshold amount longer than run times of all other query execution plans that match the first query execution plan except for the object identifier, building a new query plan for the first query, wherein the new query plan comprises the first object identifier.

16. The computer of claim 15, wherein the instructions further comprise:
if the new query plan is identical to the first query plan except that the new query plan comprises the first object identifier in place of the parameter marker, deleting the new query plan.

* * * * *